United States Patent
Nam et al.

(10) Patent No.: US 9,350,226 B2
(45) Date of Patent: May 24, 2016

(54) APPARATUS AND METHOD FOR REDUCING A NOISE IN AN OUTPUT WAVEFORM USING A MULTI-BIT SIGMA-DELTA MODULATOR AND A THREE PHASE INVERTER

(75) Inventors: Jaewon Nam, Daejeon (KR); Minki Kim, Gyeongsan (KR); Jimin Oh, Daejeon (KR); Yil Suk Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 13/620,446

(22) Filed: Sep. 14, 2012

(65) Prior Publication Data
US 2013/0135912 A1 May 30, 2013

(30) Foreign Application Priority Data
Nov. 25, 2011 (KR) .......................... 10-2011-0124212

(51) Int. Cl.
*H02M 7/5387* (2007.01)
*H02M 1/088* (2006.01)
*H02M 1/00* (2006.01)

(52) U.S. Cl.
CPC ............ *H02M 1/088* (2013.01); *H02M 7/5387* (2013.01); *H02M 2001/0012* (2013.01)

(58) Field of Classification Search
CPC ..... H02M 7/003; H02M 7/537; H02M 7/538; H02M 7/5387; H02M 7/53871; H02M 3/33523; H02J 7/022; Y02B 70/1441
USPC ................................. 363/131, 132, 80, 65, 98
See application file for complete search history.

(56) References Cited

U.S. PATENT DOCUMENTS

| 5,619,406 A | * | 4/1997 | Divan ................. H02M 7/4826 363/41 |
| 6,222,751 B1 | * | 4/2001 | Portaluri et al. ............... 363/132 |

(Continued)

FOREIGN PATENT DOCUMENTS

| KR | 10-2007-0101066 A | 10/2007 |
| KR | 10-2011-0080997 A | 7/2011 |

OTHER PUBLICATIONS

IEEE 100 The Authoritative Dictionary of IEEE Standards Terms Seventh Edition, IEEE Std 100-2000, p. 238, 2000. doi: 10.1109/IEEESTD.2000.322230 URL: http://ieeexplore.ieee.org/stamp/stamp.jsp?tp=&arnumber=4116787&isnumber=4116786.*

(Continued)

*Primary Examiner* — Gary L Laxton
*Assistant Examiner* — Kevin H Sprenger

(57) ABSTRACT

Disclosed is a power control driving device which includes a sine wave signal generating unit; a control signal converting unit configured to convert a sine wave from the sine wave signal generating unit into a multi-bit control signal; and a three-phase inverter circuit configured to output a voltage varied by the multi-bit control signal from the control signal converting unit. The control signal converting unit includes a multi-bit sigma-delta modulator configured to convert an analog sine wave into a digital signal. The three-phase inverter circuit includes a plurality of switch units, on-off states of the plurality of switch units being controlled according to the multi-bit control signal from the control signal converting unit.

18 Claims, 16 Drawing Sheets

(56) References Cited

U.S. PATENT DOCUMENTS

| | | | | |
|---|---|---|---|---|
| 6,483,354 | B1* | 11/2002 | Gasparik | 327/112 |
| 7,095,220 | B2* | 8/2006 | Kernahan | 323/300 |
| 8,030,968 | B1* | 10/2011 | Avner et al. | 326/85 |
| 2005/0073868 | A1* | 4/2005 | Hsieh | H02M 7/525 363/98 |
| 2008/0285317 | A1* | 11/2008 | Rotzoll | 363/80 |
| 2008/0310200 | A1* | 12/2008 | Maksimovic et al. | 363/65 |

OTHER PUBLICATIONS

IEEE 100 The Authoritative Dictionary of IEEE Standards Terms Seventh Edition, IEEE Std 100-2000, p. 588 , 2000. doi: 10.1109/IEEESTD.2000.322230 URL: http://ieeexplore.ieee.org/stamp/stamp.jsp?tp=&arnumber=4116787&isnumber=4116786.*

E. Dallago et al., "Sigma-delta switching power system to drive voice coilmotor in hard disk drives", IEE Proc.-Circuits Devices Syst., Dec. 2005, pp. 673-681, vol. 152, No. 6, IEE.

* cited by examiner

Fig. 11

| State | Switch Combination | | | | | | |
|---|---|---|---|---|---|---|---|
| | Sa1 | | | | Sa2 | | Sa3 |
| DRV1 | M1 | M2 | M3 | M4 | M5 | M6 | M7 |
| DRV2 | M7 | M1 | M2 | M3 | M4 | M5 | M6 |
| DRV3 | M6 | M7 | M1 | M2 | M3 | M4 | M5 |
| DRV4 | M5 | M6 | M7 | M1 | M2 | M3 | M4 |
| DRV5 | M4 | M5 | M6 | M7 | M1 | M2 | M3 |
| DRV6 | M3 | M4 | M5 | M6 | M7 | M1 | M2 |
| DRV7 | M2 | M3 | M4 | M5 | M6 | M7 | M1 |

APPARATUS AND METHOD FOR REDUCING A NOISE IN AN OUTPUT WAVEFORM USING A MULTI-BIT SIGMA-DELTA MODULATOR AND A THREE PHASE INVERTER

CROSS-REFERENCE TO RELATED APPLICATIONS

A claim for priority under 35 U.S.C. §119 is made to Korean Patent Application No. 10-2011-0124212 filed Nov. 25, 2011, in the Korean Intellectual Property Office, the entire contents of which are hereby incorporated by reference.

BACKGROUND

The inventive concepts described herein relate to a power control driving device and a method thereof, and more particularly, relate to a power control driving device controlling a power using a three-phase inverter and a method thereof.

In recent years, an electric motor and a technique for controlling a speed of the electric motor may have been developed at a power electronic field. A power control driving device may be to control a power, and may control a speed of an electric motor. A manner using a three-phase inverter may be widely used for a power control driving device for controlling a power.

With the introduction of microprocessors, the three-phase inverter may be formed of a general switch. Thus, a power control driving device may necessitate a control signal for controlling a switch. A diode rectifier or a thyristor phase-controlled rectifier may have been used to generate a control signal. Also, a pulse width modulation (PWM) manner may be proposed for accurate control. However, the power control driving device using the PWM manner may have a problem that a noise of an output power is large.

SUMMARY

Example embodiments of the inventive concept provide a power control driving device comprising a sine wave signal generating unit; a control signal converting unit configured to convert a sine wave from the sine wave signal generating unit into a multi-bit control signal; and a three-phase inverter circuit configured to output a voltage varied by the multi-bit control signal from the control signal converting unit. The control signal converting unit includes a multi-bit sigma-delta modulator configured to convert an analog sine wave into a digital signal. The three-phase inverter circuit includes a plurality of switch units, on-off states of the plurality of switch units being controlled according to the multi-bit control signal from the control signal converting unit.

In example embodiments, the multi-bit sigma-delta modulator is a secondary sigma-delta modulator.

In example embodiments, the multi-bit sigma-delta modulator is a 3-bit sigma-delta modulator.

In example embodiments, each of the plurality of switch units includes a plurality of switch sets, each of which has switches weighted according to a binary ratio.

In example embodiments, each switch set is supplied with a bit of the multi-bit control signal from the control signal converting unit.

In example embodiments, each of the plurality of switch units includes a driving level sequencer to change a combination of the switches constituting the switch set.

In example embodiments, the driving level sequencer stepwise changes a combination of the switch set by a control signal input unit.

In example embodiments, the driving level sequencer circulates a combination of the switch set with a predetermined period.

Example embodiments of the inventive concept also provide a power control driving method comprising converting a three-phase sine wave into a multi-bit digital signal through a multi-bit sigma-delta modulator; and providing the multi-bit digital signal to a three-phase inverter. The three-phase inverter includes a plurality of switch units, on-off states of the plurality of switch units being controlled according to the multi-bit digital control signal.

In example embodiments, the power control driving method further comprises changing a combination of switches included in switch sets constituting the plurality of switch units.

In example embodiments, changing a combination of switches is circulated with a predetermined period.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 11 is a table illustrating an order of switch sets configured by a driving level sequencer according to the inventive concept.

DETAILED DESCRIPTION

Figure 1:
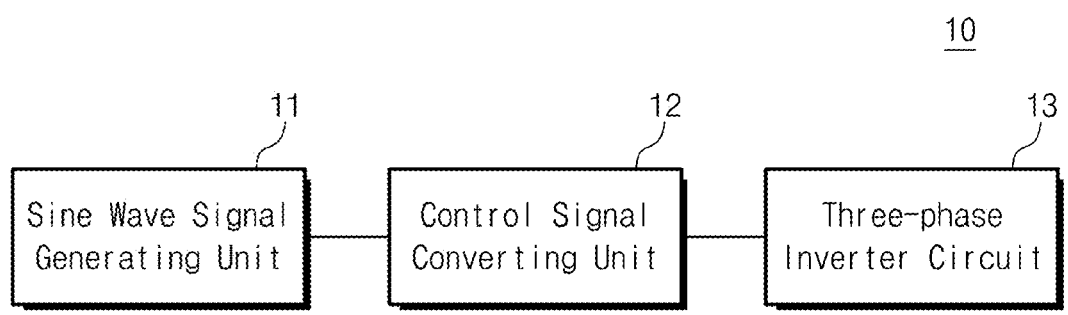
FIG. 1 is a block diagram schematically illustrating a power control driving device according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a power control driving device according to an embodiment of the inventive concept. Referring to FIG. 1, a power control driving device 10 may include a sine wave signal generating unit 11, a control signal converting unit 12, and a three-phase inverter circuit 13.

The sine wave signal generating unit 11 may generate a three-phase sine wave.

The control signal converting unit 12 may receive the three-phase sine wave from the sine wave signal generating unit 11 to convert it into a digitalized control signal. The control signal converting unit 12 may include a PWM modulator.

The three-phase inverter circuit 13 may receive a control signal from the control signal converting unit 12, and may include switches. The switches of the three-phase inverter circuit 13 may be turned on or off according to the control signal. An output of the power control driving device 10 may be changed when states of the switches of the three-phase inverter circuit 13 are varied.

However, the power control driving device 10 using a PWM modulator may have a problem that the control signal is varied stepwise and sharply. As the control signal is sharply varied, switch impedance may be also changed sharply. This may mean that an output signal includes much noise. To solve this problem, the inventive concept may provide a technique for generating a control signal using a sigma-delta modulator instead of a PWM modulator.

The sigma-delta modulator may be a modulator which uses a loop filter and feedback to change a spectrum characteristic of quantization noise generated from a quantizer. The sigma-delta modulator may be an oversampling modulator.

A channel length of a CMOS transistor may continue to be shortened as a semiconductor technology is developed. Thus, the CMOS transistor may be suitable for oversampling used at the sigma-delta modulator. As a sampling frequency become higher, quantization noise may be reduced. Thus, the sigma-delta modulator may have the excellent noise performance.

When a power switch is driven by a sigma-delta modulator, low-frequency white noise may be filtered according to the oversampling theory, so that noise shaping causing modulation into a harmonic wave is generated. Compared with the case that a PWM modulator is used, the high linearity and low-noise performance may be acquired when the sigma-delta modulator is used.

The performance of the sigma-delta modulator may be improved by increasing the degree of the sigma-delta modulator or using a multi-bit manner. However, if the sigma-delta modulator having the high degree is used, a loop filter gain may become high. This may cause lowering of the stability. That is, an output signal of the sigma-delta modulator may be diverged. With the inventive concept, thus, a multi-bit sigma-delta modulator may be applied to a power switch driving unit.

Figure 2:
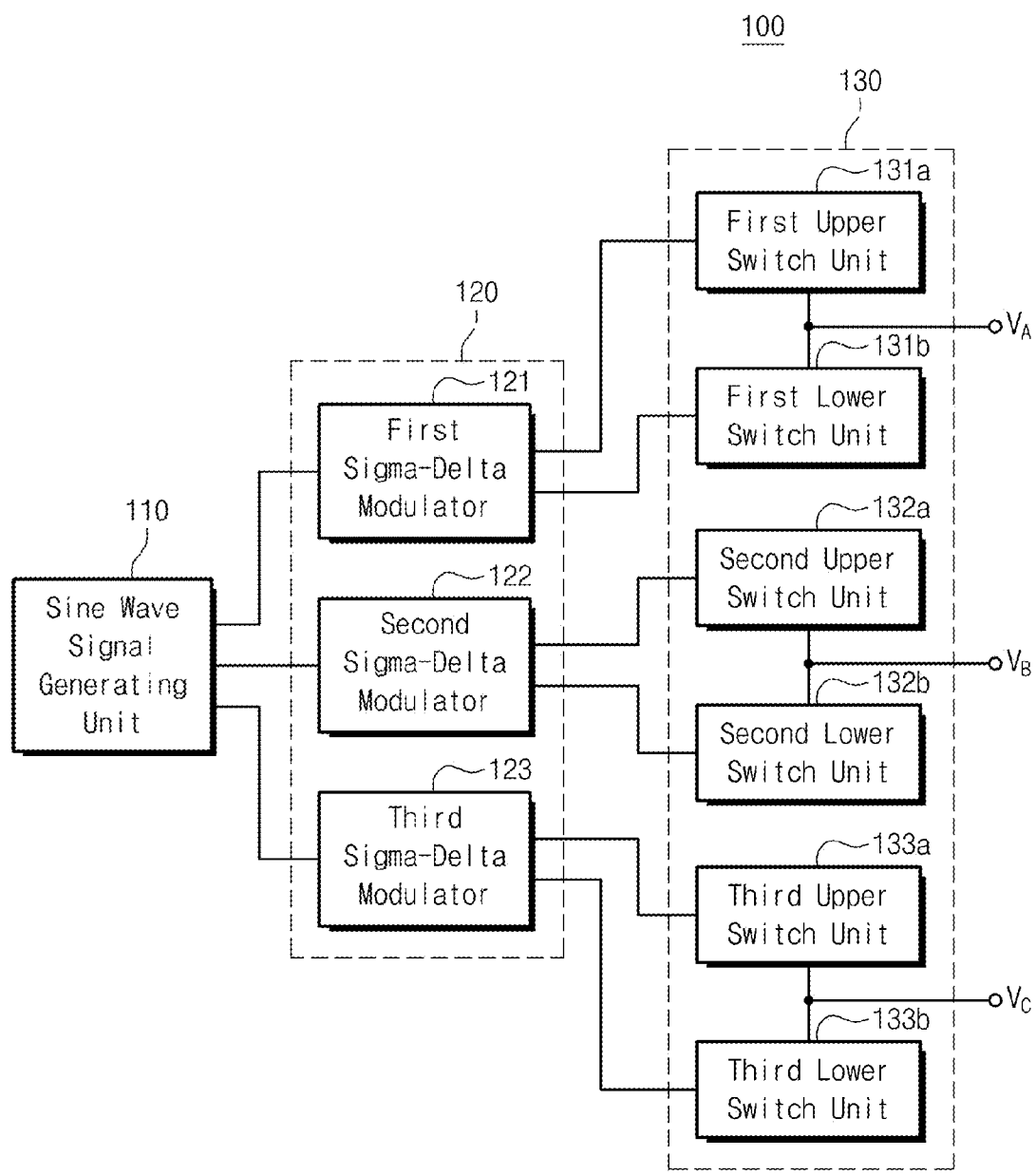
FIG. 2 is a block diagram schematically illustrating a power control driving unit according to another embodiment of the inventive concept.

FIG. 2 is a block diagram schematically illustrating a power control driving unit according to another embodiment of the inventive concept. Referring to FIG. 2, a power control driving unit 100 may include a sine wave signal generating unit 110, a control signal converting unit 120, and a three-phase inverter circuit 130.

The sine wave signal generating unit 110 may generate a three-phase sine wave signal. Frequency and amplitude of the three-phase sine wave signal may be variable. Since the frequency and amplitude of the three-phase sine wave signal are variable, output frequency and amplitude of the power control driving device 100 may be variable. Each phase (hereinafter, referred to as an A phase, a B phase, and a C phase) of a sine wave generated from the sine wave signal generating unit 110 may be sent to the control signal converting unit 120.

The control signal converting unit 120 may convert a three-phase sine wave input from the sine wave signal generating unit 110 into a control signal. The control signal converting unit 120 may include a first sigma-delta modulator 121, a second sigma-delta modulator 122, and a third sigma-delta modulator 123. The first to third sigma-delta modulators 121 to 123 may be configured to have the same structure. Also, the same synchronization clock signal may be applied to the first to third sigma-delta modulators 121 to 123.

The first sigma-delta modulator 121 may receive an A-phase sine wave voltage from the sine wave signal generating unit 110. It is assumed that the first sigma-delta modulator 121 converts an input sine wave voltage into a 3-bit digital signal. However, the inventive concept is not limited thereto. It is assumed that a 3-bit sigma-delta modulator is used. However, the inventive concept is not limited thereto. For example, the inventive concept may be applied to other multi-bit sigma-delta modulators. The first sigma-delta modulator 121 may output a first control signal and a first inversion signal being an inverted version of the first control signal as control signals.

The second and third sigma-delta modulators 122 and 123 may operate the same as described above. The second sigma-delta modulator 122 may receive a B-phase sine wave voltage from the sine wave signal generating unit 110. The second sigma-delta modulator 122 may convert an input sine wave voltage into a 3-bit digital signal. The second sigma-delta modulator 122 may output a second control signal and a second inversion signal being an inverted version of the first control signal as control signals.

The third sigma-delta modulator 123 may receive a C-phase sine wave voltage from the sine wave signal generating unit 110. The third sigma-delta modulator 123 may convert an input sine wave voltage into a 3-bit digital signal. The third sigma-delta modulator 123 may output a third control signal and a third inversion signal being an inverted version of the first control signal as control signals.

The three-phase inverter circuit 130 may receive control signals from the control signal converting unit 120. The three-phase inverter circuit 130 may include a first upper switch unit 131a, a first lower switch unit 131b, a second upper switch unit 132a, a second lower switch unit 132b, a third upper switch unit 133a, and a third lower switch unit 133b. Corresponding upper and lower switch units in the three-phase inverter circuit 130 may be connected in series as illustrated in FIG. 2.

The first control signal may be applied to the first upper switch unit 131a from the first sigma-delta modulator 121. The first inversion signal may be applied to the first lower switch unit 131b from the first sigma-delta modulator 121. The first control signal and the first inversion signal may be opposite to each other. Thus, on-off states of the first upper switch unit 131a and the first lower switch unit 131b may be opposite to each other. In FIG. 2, $V_A$ may be an A-phase output voltage, and may be a voltage between the first upper switch unit 131a and the first lower switch unit 131b. Below, a switching unit will be more fully described with reference to accompanying drawings.

Figure 3:
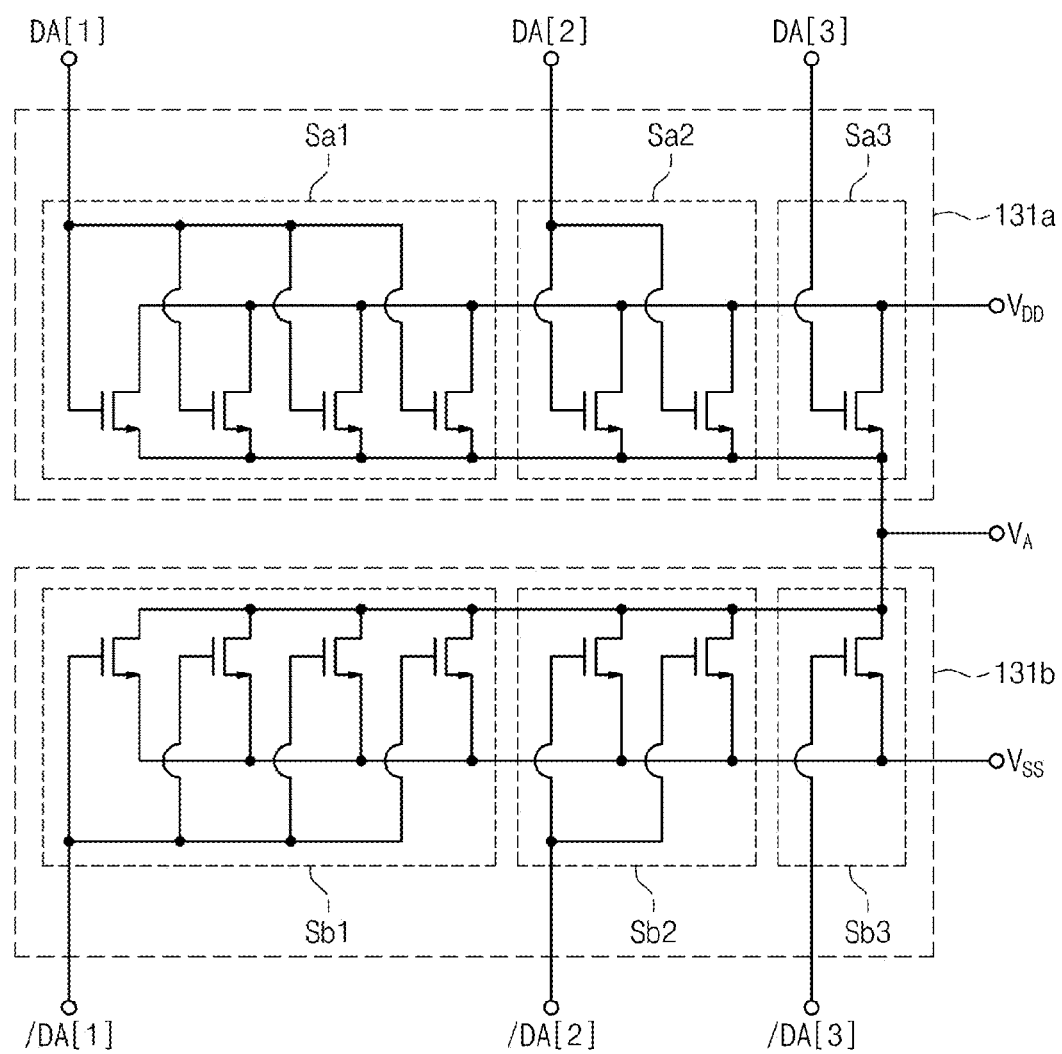
FIG. 3 is a circuit diagram illustrating a first upper switch unit and a first lower switch unit in FIG. 2.

FIG. 3 is a circuit diagram illustrating a first upper switch unit and a first lower switch unit in FIG. 2. Referring to FIG. 3, a first upper switch unit 131a may include three switch sets Sa1, Sa2, and Sa3. $V_{DD}$ may be a drain bias voltage, and $V_{SS}$ may be a source bias voltage.

A first MSB switch set Sa1 may be provided with a first bit DA[1] of a first control signal. A first middle bit (MB) switch set Sa2 may be provided with a second bit DA[2] of the first control signal. A first LSB switch set Sa3 may be provided with a third bit DA[3] of the first control signal.

Three switch sets may be weighted sets of switches according to a bit number of an input control signal. The first MSB switch set Sa1 may be formed of four switches. The first MB switch set Sa2 may be formed of two switches. The first LSB switch set Sa3 may be formed of a switch. That is, three switch sets may be weighted sets having a ratio of 4:2:1.

As each bit of the first control signal is varied, an on-off state of each switch set may be changed. As an on-off state of each switch set is changed, the whole impedance of the first upper switch unit 131a may be varied.

A first lower switch unit 131b may include three switch sets Sb1, Sb2, and Sb3. A second MSB switch set Sb1 may be provided with a first bit DA[1] of a first inversion signal. A second middle bit (MB) switch set Sb2 may be provided with a second bit /DA[2] of the first inversion signal. A second LSB switch set Sb3 may be provided with a third bit /DA[3] of the first inversion signal.

Three switch sets may be weighted sets of switches according to a bit number of an input control signal. The second MSB switch set Sb1 may be formed of four switches. The second MB switch set Sb2 may be formed of two switches. The second LSB switch set Sb3 may be formed of a switch. That is, three switch sets may be weighted sets having a ratio of 4:2:1.

As each bit of the first inversion signal is varied, an on-off state of each switch set may be changed. As an on-off state of each switch set is changed, the whole impedance of the first lower switch unit 131b may be varied. The first control signal and the first inversion signal may be opposite to each other. Thus, on-off states of the first upper switch unit 131a and the first lower switch unit 131b may be opposite to each other.

As described above, each of the first upper switch unit 131a and the first lower switch unit 131b may include a plurality of switch sets to correspond to multi-bit control and inversion signals. Thus, compared with the case that each switch unit is formed of a switch, impedance of each of the first upper switch unit 131a and the first lower switch unit 131b may be varied smoothly.

The first upper switch unit 131a and the first lower switch unit 131b are illustrated in FIG. 3. However, it is understood that a circuit structure in FIG. 3 is identically applied to a second upper switch unit 132a, a second lower switch unit 132b, a third upper switch unit 133a, and a third lower switch unit 133b.

In example embodiments, a 3-bit sigma-delta modulator may be used. Thus, each upper switch unit may be configured to include seven switches. However, the inventive concept is not limited thereto. The number of switches in an upper switch unit may be varied according to a bit number of a sigma-delta modulator to be used. For example, when a 4-bit sigma-delta modulator is used, an upper switch unit may include 15 switches that are set to have a ratio of 8:4:2:1.

Returning to FIG. 2, the remaining switch units 132a, 132b, 133a, and 133b may operate the same as the upper and lower switch units 131a and 131b.

That is, a second control signal may be applied to the second upper switch unit 132a from a second sigma-delta modulator 122. A second inversion signal may be applied to the second lower switch unit 132b from the second sigma-delta modulator 122. The second control signal and the second inversion signal may be opposite to each other. Thus, on-off states of the second upper switch unit 132a and the second lower switch unit 132b may be opposite to each other. In FIG. 2, $V_B$ may be a B-phase output voltage, and may be a voltage between the second upper switch unit 132a and the second lower switch unit 132b.

A third control signal may be applied to the third upper switch unit 133a from a third sigma-delta modulator 123. A third inversion signal may be applied to the third lower switch unit 133b from the third sigma-delta modulator 123. The third control signal and the third inversion signal may be opposite to each other. Thus, on-off states of the third upper switch unit 133a and the third lower switch unit 133b may be opposite to each other. In FIG. 2, $V_C$ may be a C-phase output voltage, and may be a voltage between the third upper switch unit 133a and the lower switch unit 133b.

With the power control driving device 100 of the inventive concept, an output voltage having less noise may be smoothly varied through a 3-bit sigma-delta modulator and a three-phase inverter formed of a plurality of switch sets corresponding thereto.

Figure 4:
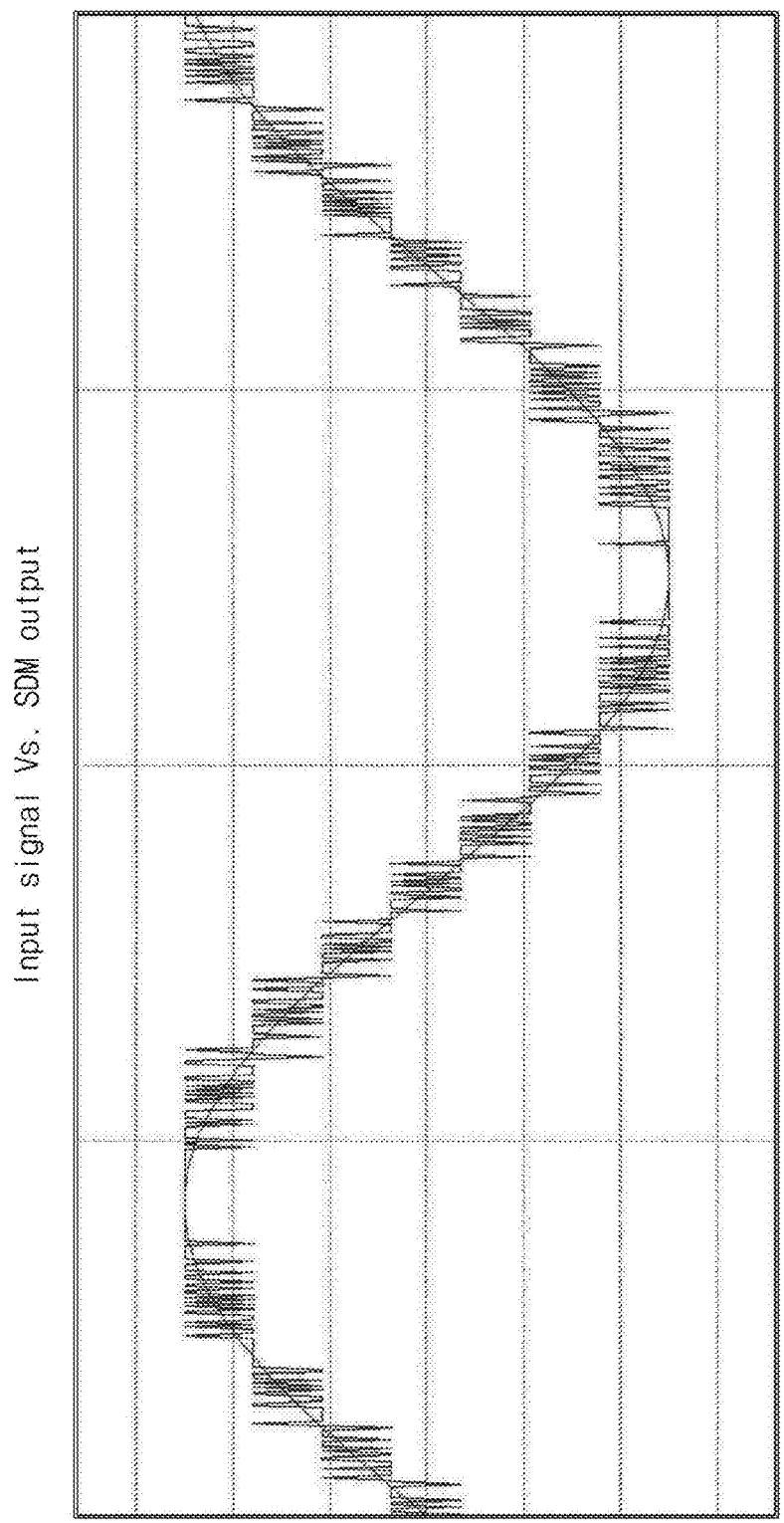
FIG. 4 is a diagram illustrating a single-phase output phase voltage of a switch by driving of a 3-bit sigma-delta modulator.

FIG. 4 is a diagram illustrating a single-phase output phase voltage of a switch by driving of a 3-bit sigma-delta modulator. $V_{INA}$ may be a single-phase sine wave generated by a sine wave signal generating unit. Referring to FIG. 4, driving of a power switch with a sine wave by a 3-bit sigma-delta modulator may enable an impedance value to vary smoothly at a phase-voltage node (e.g., a node where $V_A$ is measured).

Thus, it is possible to obtain a smooth and noise-less (noise-reduced) output waveform by using a multi-bit sigma-delta modulator.

An output phase-voltage of a power control driving unit 100 will be more fully described using the following equations.

Figure 5:
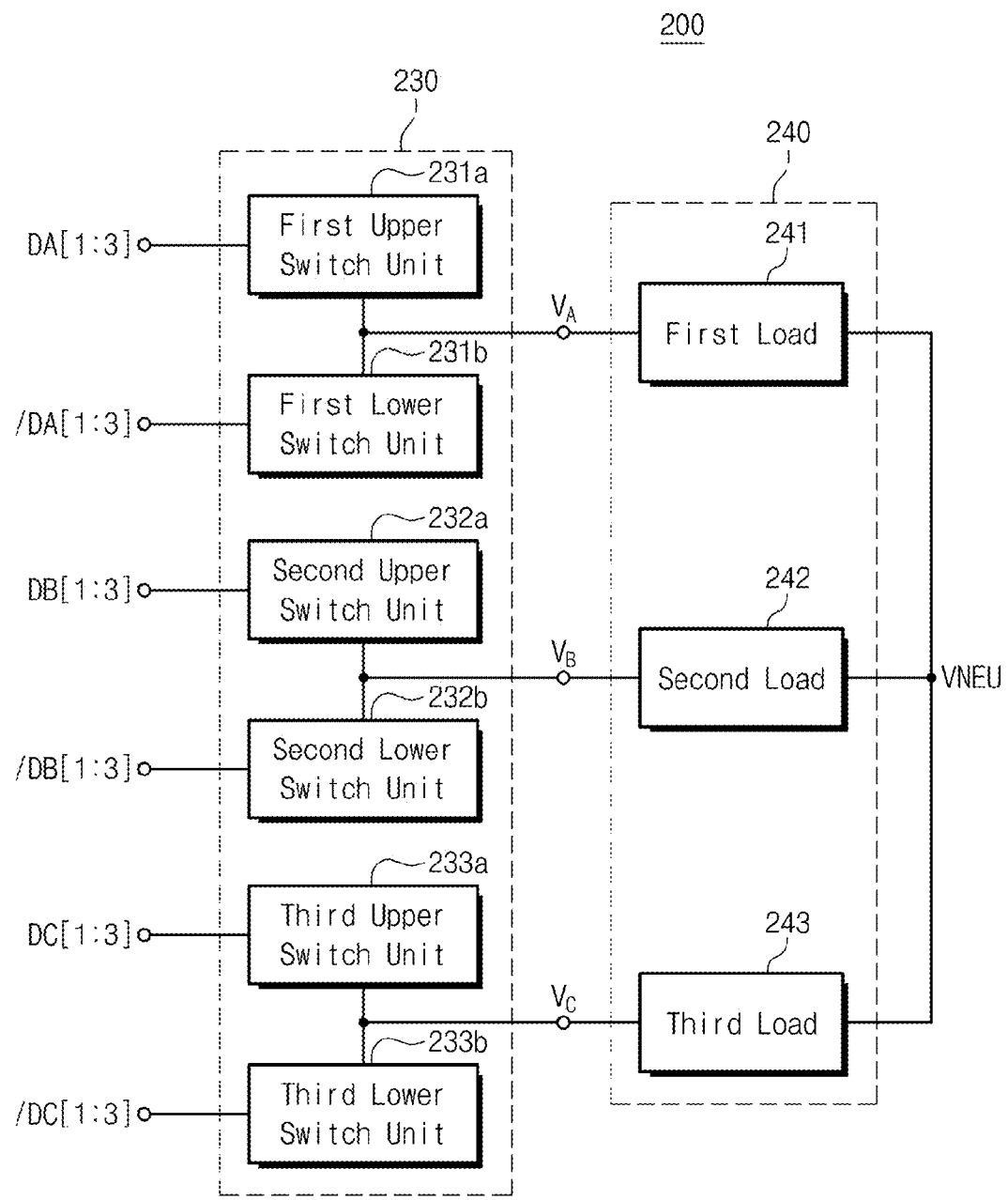
FIG. 5 is a block diagram schematically illustrating a three-phase inverter circuit and a load according to an embodiment of the inventive concept.

FIG. 5 is a block diagram schematically illustrating a three-phase inverter circuit and a load according to an embodiment of the inventive concept. Referring to FIG. 5, a three-phase inverter circuit may include a first upper switch unit 231a, a first lower switch unit 231b, a second upper switch unit 232a, a second lower switch unit 232b, a third upper switch unit 233a, and a third lower switch unit 233b. A load circuit 240 may include a first load 241, a second load 242, and a third load 243.

An A-phase voltage node (a node from which an A-phase output phase voltage $V_A$ is output) being an interconnection point of the first upper switch unit 231a and the first lower switch unit 231b may be connected with the first load 241. A B-phase voltage node (a node from which a B-phase output phase voltage $V_B$ is output) being an interconnection point of the second upper switch unit 232a and the second lower switch unit 232b may be connected with the second load 242. A C-phase voltage node (a node from which a C-phase output phase voltage $V_C$ is output) being an interconnection point of the third upper switch unit 233a and the third lower switch unit 233b may be connected with the third load 243.

Below, impedance of the first load 241 may be referred to as ZAM, impedance of the second load 242 may be referred to as ZBM, and impedance of the third load 243 may be referred to as ZCM. A phase voltage equation associated with output phase voltages $V_A$, $V_B$, and $V_C$ on respective phases may be expressed by the following equation 1. In the equation 1, $Z_{AP}$ may be impedance of the first upper switch unit 231a seen from the A-phase voltage node, and $Z_{AN}$ may be impedance of the first lower switch unit 231b seen from the A-phase voltage node. $Z_{BP}$ may be impedance of the second upper switch unit 232a seen from the B-phase voltage node, and $Z_{BN}$ may be impedance of the second lower switch unit 232b seen from the B-phase voltage node. $Z_{CP}$ may be impedance of the third upper switch unit 233a seen from the C-phase voltage node, and $Z_{CN}$ may be impedance of the third lower switch unit 233b seen from the C-phase voltage node. $V_{NEU}$ may indicate a neutral voltage of an output stage varied by a phase current. $V_{DD}$ may indicate a drain bias voltage of a switch unit, and $V_{SS}$ may indicate a source bias voltage thereof.

$$\begin{bmatrix} \frac{1}{Z_{AP}} + \frac{1}{Z_{AN}} + \frac{1}{Z_{AM}} & 0 & 0 & -\frac{1}{Z_{AM}} \\ 0 & \frac{1}{Z_{BP}} + \frac{1}{Z_{BN}} + \frac{1}{Z_{BM}} & 0 & -\frac{1}{Z_{BM}} \\ 0 & 0 & \frac{1}{Z_{CN}} + \frac{1}{Z_{CN}} + \frac{1}{Z_{CM}} & -\frac{1}{Z_{CM}} \\ \frac{1}{Z_{AM}} & \frac{1}{Z_{BM}} & \frac{1}{Z_{CM}} & \frac{1}{Z_{AM}} + \frac{1}{Z_{BM}} + \frac{1}{Z_{CM}} \end{bmatrix} \quad \text{[Equation 1]}$$

$$\begin{bmatrix} V_A \\ V_B \\ V_C \\ V_{NEU} \end{bmatrix} = \begin{bmatrix} \frac{V_{DD}}{Z_{AP}} + \frac{V_{SS}}{Z_{AZ}} \\ \frac{V_{DD}}{Z_{BP}} + \frac{V_{SS}}{Z_{BN}} \\ \frac{V_{DD}}{Z_{CP}} + \frac{V_{SS}}{Z_{CN}} \\ 0 \end{bmatrix}$$

The impedances may be calculated according to the following equations 2 to 10.

$$z_{AP} = \frac{sL_{PWR} + R_{AP}}{1 + sC_{AP} * (sL_{PWR} + R_{AP})} \quad [\text{Equation 2}]$$

$$z_{BP} = \frac{sL_{PWR} + R_{BP}}{1 + sC_{BP} * (sL_{PWR} + R_{BP})} \quad [\text{Equation 3}]$$

$$z_{CP} = \frac{sL_{PWR} + R_{CP}}{1 + sC_{CP} * (sL_{PWR} + R_{CP})} \quad [\text{Equation 4}]$$

$$z_{AN} = \frac{sL_{PWR} + R_{AN}}{1 + sC_{AN} * (sL_{PWR} + R_{AN})} \quad [\text{Equation 5}]$$

$$z_{BN} = \frac{sL_{PWR} + R_{BN}}{1 + sC_{BN} * (sL_{PWR} + R_{BN})} \quad [\text{Equation 6}]$$

$$z_{CN} = \frac{sL_{PWR} + R_{CN}}{1 + sC_{CN} * (sL_{PWR} + R_{CN})} \quad [\text{Equation 7}]$$

$$z_{AM} = \frac{sL_{MOT,A} + R_{MOT,A}}{1 + sC_{MOT,A} * (sL_{MOT,A} + R_{MOT,A})} \quad [\text{Equation 8}]$$

$$z_{BM} = \frac{sL_{MOT,B} + R_{MOT,B}}{1 + sC_{MOT,B} * (sL_{MOT,B} + R_{MOT,B})} \quad [\text{Equation 9}]$$

$$z_{CM} = \frac{sL_{MOT,C} + R_{MOT,C}}{1 + sC_{MOT,C} * (sL_{MOT,C} + R_{MOT,C})} \quad [\text{Equation 10}]$$

In the above equations 2 to 10, $L_{PWR}$ may indicate power device-line lead inductance, that is, inductance between an upper switch unit and a power supply line. $C_{AP}$, $C_{BP}$, $C_{CP}$, $C_{AN}$, $C_{BN}$, and $C_{CN}$ may be capacitance of upper switch units, and may be equal to $C_{PWR}$. $C_{PWR}$ may indicate power device output decoupling capacitance.

$L_{MOT,A}$ may indicate inductance of the first load 241, $L_{MOT,B}$ may indicate inductance of the second load 242, and $L_{MOT,C}$ may indicate inductance of the third load 243. $R_{MOT,A}$ may indicate resistance of the first load 241, $R_{MOT,B}$ may indicate resistance of the second load 242, and $R_{MOT,C}$ may indicate resistance of the third load 243. $C_{MOT,A}$ may indicate capacitance of the first load 241, $C_{MOT,B}$ may indicate capacitance of the second load 242, and $C_{MOT,C}$ may indicate capacitance of the third load 243.

$R_{AP}$, $R_{BP}$, and $R_{CP}$ may indicate resistance of the first to third upper switch units 231a to 233a, respectively. $R_{AN}$, $R_{BN}$, and $R_{CN}$ may indicate resistance of the first to third lower switch units 231b to 233b, respectively.

Each resistance may be expressed by the following equations 11 to 16.

$$R_{AP}=(D_A[1] \times R_{UNIT}/4) \| (D_A[2] \times R_{UNIT}/2) \| (D_A[3] \times R_{UNIT}) \quad [\text{Equation 11}]$$

$$R_{AN}=(/D_A[1] \times R_{UNIT}/4) \| (/D_A[2] \times R_{UNIT}/2) \| (/D_A[3] \times R_{UNIT}) \quad [\text{Equation 12}]$$

$$R_{BP}=(D_B[1] \times R_{UNIT}/4) \| (D_B[2] \times R_{UNIT}/2) \| (D_B[3] \times R_{UNIT}) \quad [\text{Equation 13}]$$

$$R_{BN}=(/D_B[1] \times R_{UNIT}/4) \| (/D_B[2] \times R_{UNIT}/2) \| (/D_B[3] \times R_{UNIT}) \quad [\text{Equation 14}]$$

$$R_{CP}=(D_C[1] \times R_{UNIT}/4) \| (D_C[2] \times R_{UNIT}/2) \| (D_C[3] \times R_{UNIT}) \quad [\text{Equation 15}]$$

$$R_{CN}=(/D_C[1] \times R_{UNIT}/4) \| (/D_C[2] \times R_{UNIT}/2) \| (/D_C[3] \times R_{UNIT}) \quad [\text{Equation 16}]$$

$D_A[n]$, $D_B[n]$, and $D_C[n]$ (n being 1, 2, or 3) may indicate nth bits of first, second, and third control signals DA[1:3], DB[1:3], and DC[1:3], respectively. $/D_A[n]$, $/D_B[n]$, and $/D_C[n]$ (n being 1, 2, or 3) may indicate nth bits of first, second, and third inversion signals /DA[1:3], /DB[1:3], and /DC[1:3], respectively. $R_{UNIT}$ may indicate a resistance value when one of switches in a switch unit is turned on.

In the equations 11 to 16, "||" may indicate parallel resistance calculation. That is, A1||A2=(A1*A2)/(A1+A2).

As understood from the above equations, an output phase voltage may be determined according to drain and source bias voltages, impedance of a switch unit, and impedance of a load circuit. Impedance of a switch unit may be smoothly varied when switches of the switch unit are turned on or off.

Figure 6:
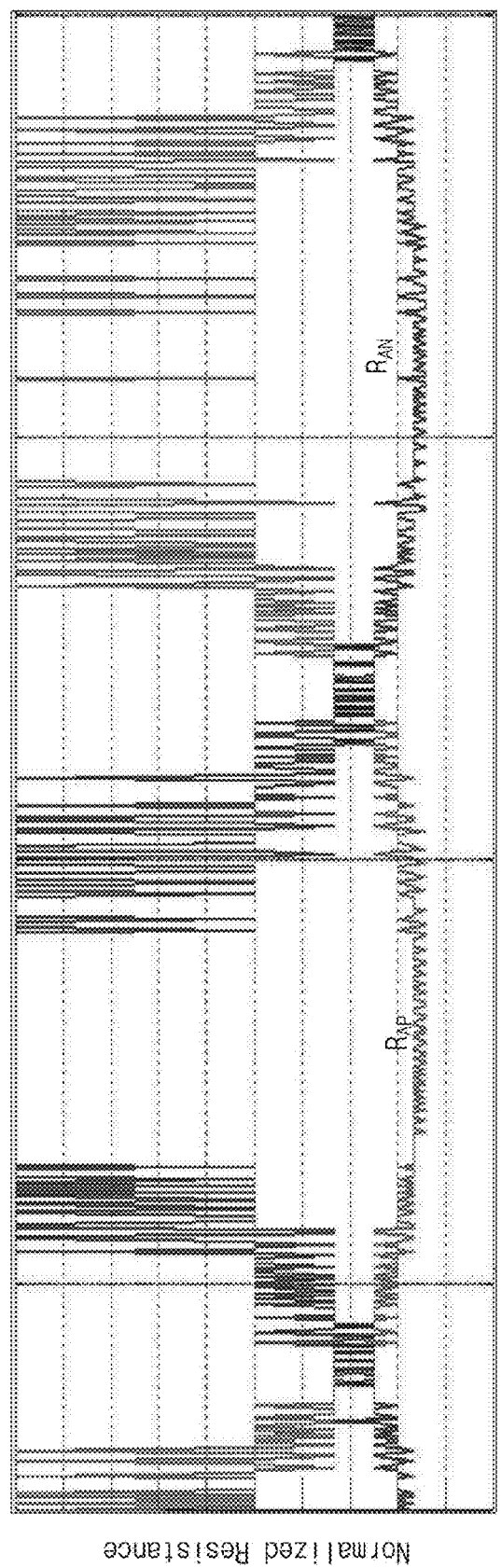
FIG. 6 is a graph illustrating a variation in resistance of an upper switch unit and a variation in resistance of a lower switch unit when a bit sigma-delta modulator is used.

FIG. 6 is a graph illustrating a variation in resistance of an upper switch unit and a variation in resistance of a lower switch unit when a bit sigma-delta modulator is used. Referring to FIG. 6, resistance $R_{AP}$ of an upper switch unit and resistance $R_{AN}$ of a lower switch unit may be gradually varied.

When a driving manner using conventional PWM is used, a switch may have infinite impedance at an off state and predetermined impedance at an on state. Thus, resistance of a switch may be sharply varied stepwise from an infinite value to a predetermined value. This may cause high-frequency noise. With the power control driving device of the inventive concept, the high-frequency noise characteristic may be improved through a sigma-delta modulator.

Figure 7:
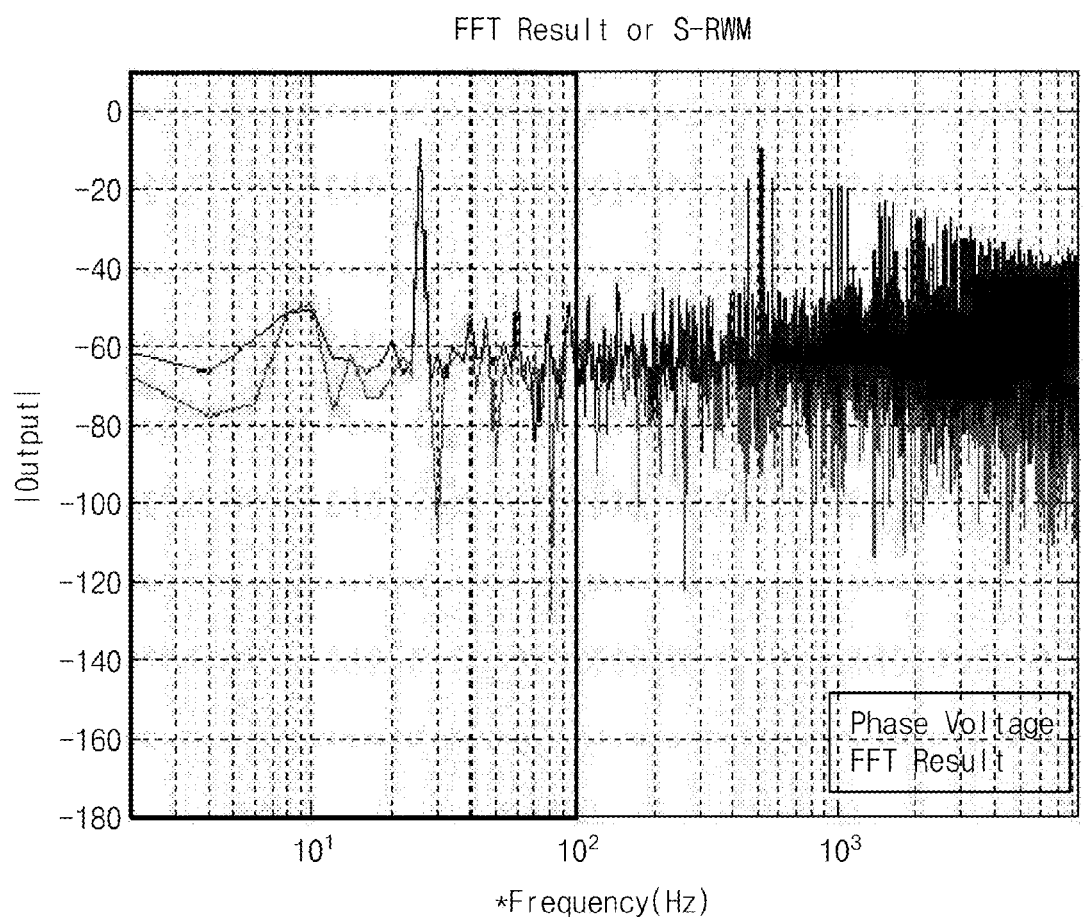
FIG. 7 is a diagram an output of a power control driving device using a conventional PWM modulator analyzed through the FFT spectrum.

FIG. 7 is a diagram an output of a power control driving device using a conventional PWM modulator analyzed through the FFT spectrum.

Figure 8:
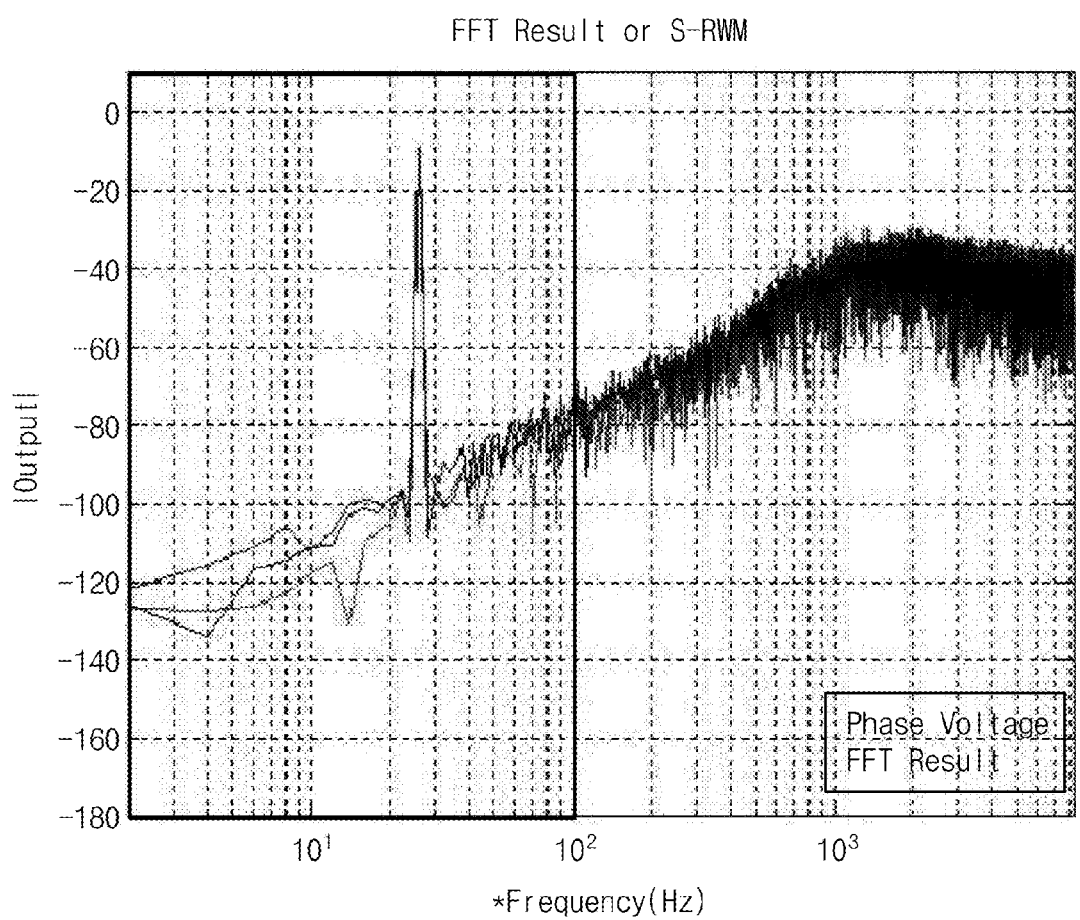
FIG. 8 is a diagram an output of a power control driving device using a secondary 1-bit PWM modulator analyzed through the FFT spectrum.

FIG. 8 is a diagram an output of a power control driving device using a secondary 1-bit PWM modulator analyzed through the FFT spectrum.

Figure 9:
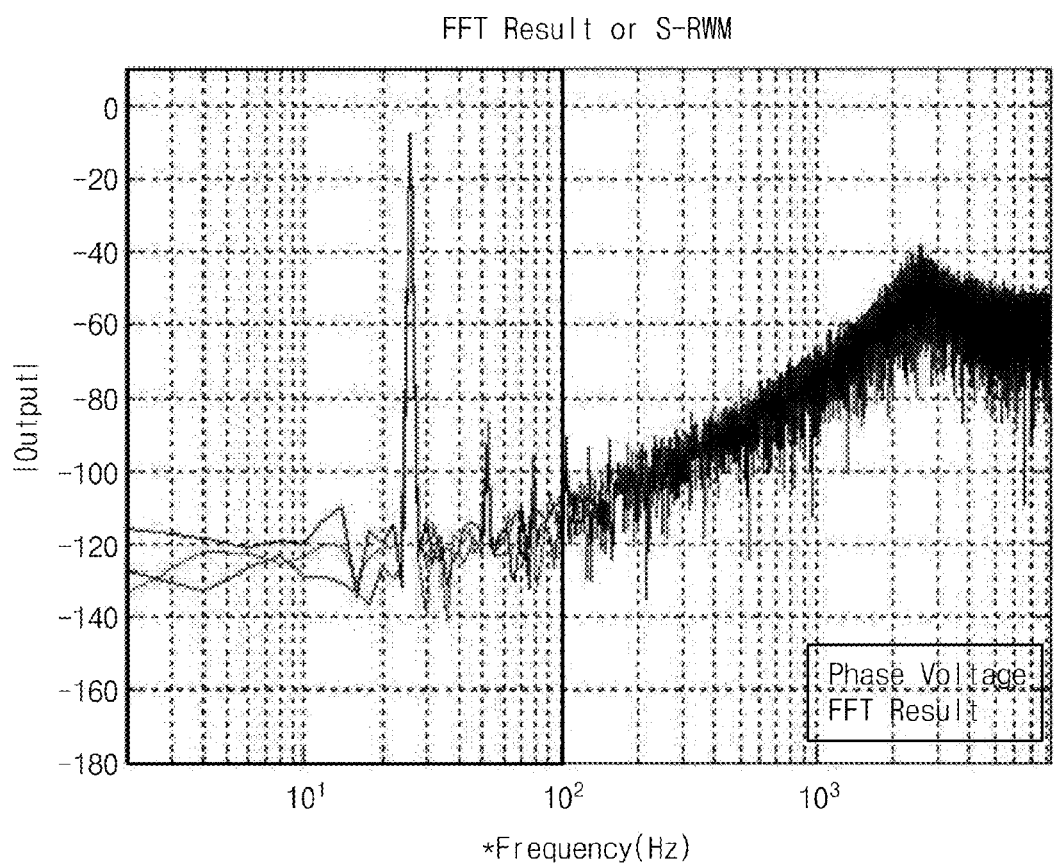
FIG. 9 is a diagram an output of a power control driving device using a secondary 3-bit PWM modulator analyzed through the FFT spectrum.

FIG. 9 is a diagram an output of a power control driving device using a secondary 3-bit PWM modulator analyzed through the FFT spectrum. Upon analysis, a stability-free secondary sigma-delta modulator is used.

It is understood from FIGS. 7, 8, and 9 that a manner according to the inventive concept is excellent in a level of a noise signal with respect to a 28 Hz driving command signal compared with a conventional manner. Also, it is understood that the performance of a calculated value (6.02 dB×3-bit=18 dB) is improved as compared with a 1-bit sigma-delta modulator.

However, a 3-bit sigma-delta modulator may obtain a noise level lower than a 1-bit sigma-delta modulator, while it has a harmonic wave noise peak The harmonic wave may be generated since a power switch is divided to use multiple bits. This drawback may be solved using a switch recursive algorithm which will be described below. With the switch recursive algorithm, since mismatching noise is dispersed into the whole frequency band, noise may be offset.

Figure 10A:
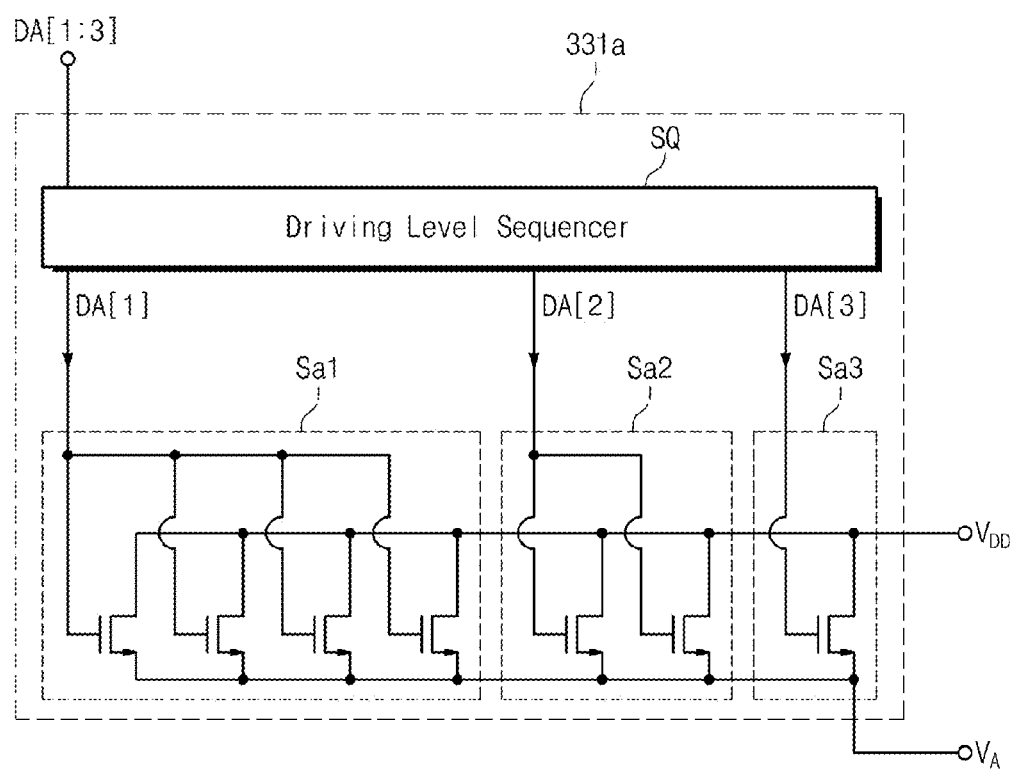
FIG. 10A is a circuit diagram schematically illustrating an upper switch unit according to another embodiment of the inventive concept.

FIG. 10A is a circuit diagram schematically illustrating an upper switch unit according to another embodiment of the inventive concept. In FIG. 10A, there is only illustrated a first upper switch unit. However, other switch units may be configured substantially the same as illustrated in FIG. 10A. Referring to FIG. 10A, a first upper switch unit 331a may include three switch sets Sa1, Sa2, and Sa3 weighted according to a ratio of 4:2:1 and a driving level sequencer SQ. A first control signal DA[1:3] may be provided to the first upper switch unit 331a.

A first MSB switch set Sa1 may be provided with a first bit DA[1] of the first control signal. A first MB switch set Sa2 may be provided with a second bit DA[2] of the first control signal. A first LSB switch set Sa3 may be provided with a third bit DA[3] of the first control signal.

The first MSB switch set Sa1 may be formed of four switches. The first MB switch set Sa2 may be formed of two switches. The first LSB switch set Sa3 may be formed of one switch.

The driving level sequencer SQ may apply three bits of the first control signal DA[1:3] to the switch sets Sa1, Sa2, and Sa3, respectively. At this time, the driving level sequencer SQ may sequentially control switches of the switch sets Sa1, Sa2, and Sa3 all the time. That is, the driving level sequencer SQ may control of the switch sets Sa1, Sa2, and Sa3 whenever a 3-bit control signal is received. Thus, the driving level sequencer SQ may offset noise due to switch mismatching.

Figure 10B:
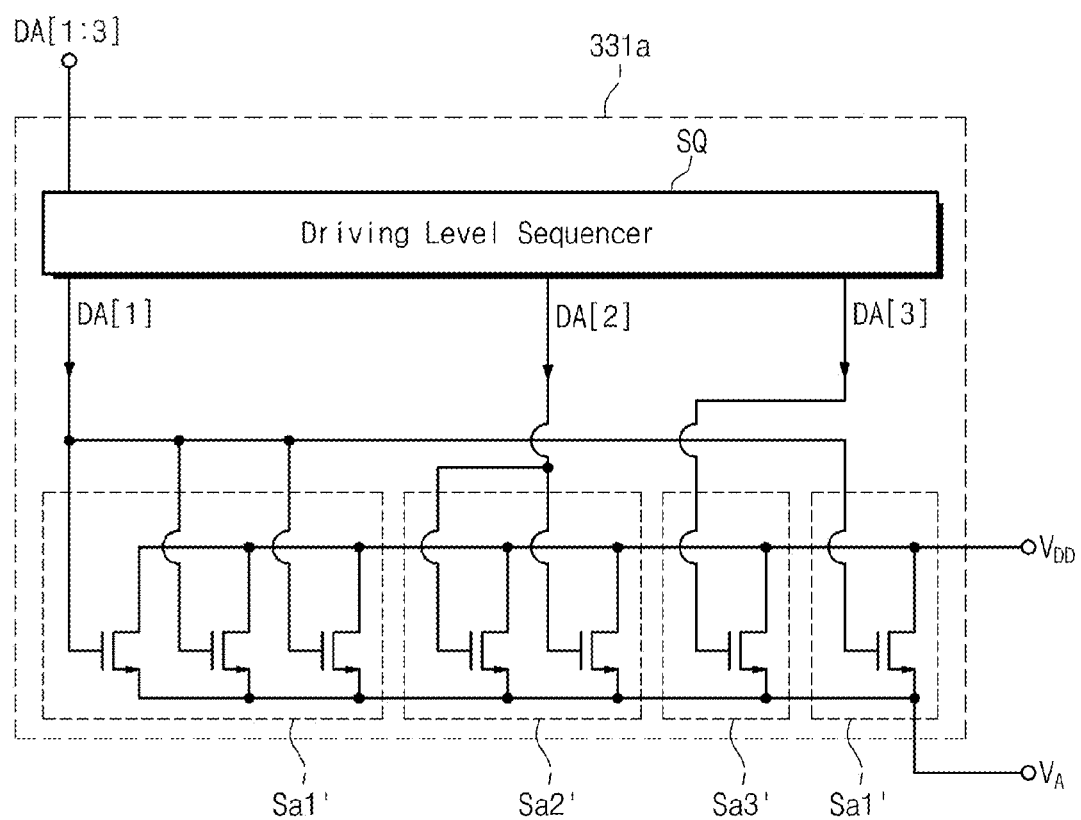
FIG. 10B is a circuit diagram schematically illustrating an upper switch unit according to still another embodiment of the inventive concept.

FIG. 10B is a circuit diagram schematically illustrating an upper switch unit according to still another embodiment of the inventive concept. It is understood from FIG. 10B that the number of switches in switch sets Sa1', Sa2', and Sa3' controlled by a driving level sequencer may be changed.

FIG. 11 is a table illustrating an order of switch sets configured by a driving level sequencer according to the inventive concept. Referring to FIG. 11, seven states may be recursive, and grouping may be made. A first upper switch unit in FIG. 10A may be at a DRV1 state, and a first upper switch unit in FIG. 10B may be at a DRV2 state.

Figure 12:
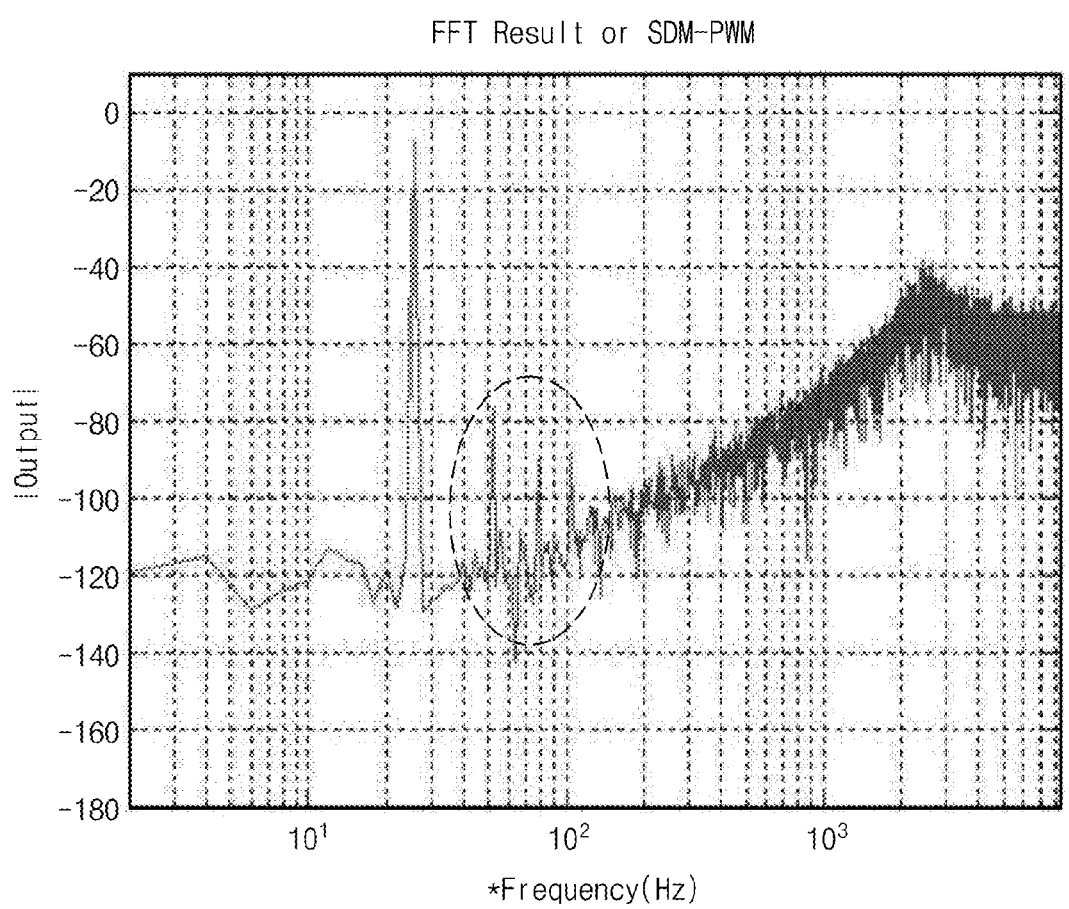
FIG. 12 is a diagram illustrating an FFT analysis result on an output of a power control driving device using a conventional switch unit to which a recursive algorithm is not applied.

FIG. 12 is a diagram illustrating an FFT analysis result on an output of a power control driving device using a conventional switch unit to which a recursive algorithm is not applied.

Figure 13:
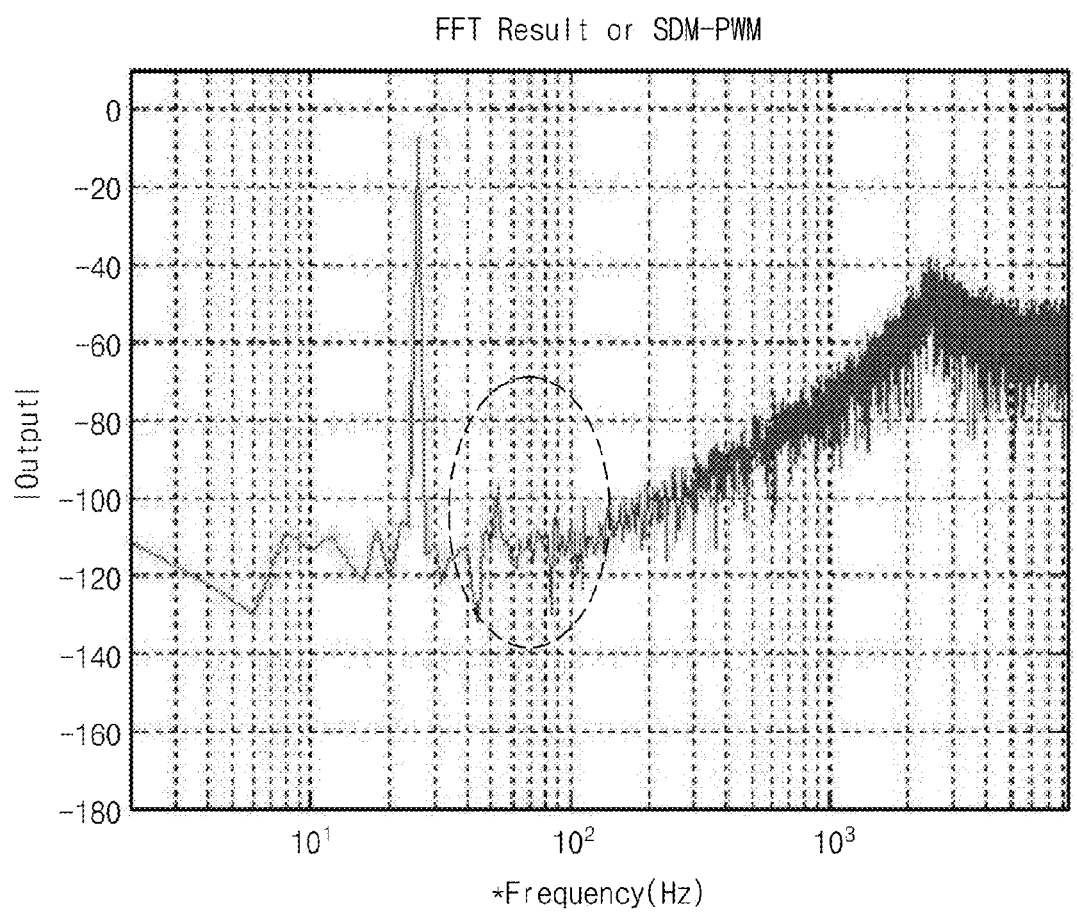
FIG. 13 is a diagram illustrating an FFT analysis result on an output of a power control driving device using an improved switch unit to which a recursive algorithm is applied.

FIG. 13 is a diagram illustrating an FFT analysis result on an output of a power control driving device using an improved switch unit to which a recursive algorithm is applied.

Referring to FIGS. 12 and 13, a power control device using an improved switch unit may have an improved harmonic wave noise characteristic compared with a power control device using a conventional switch unit.

Figure 14:
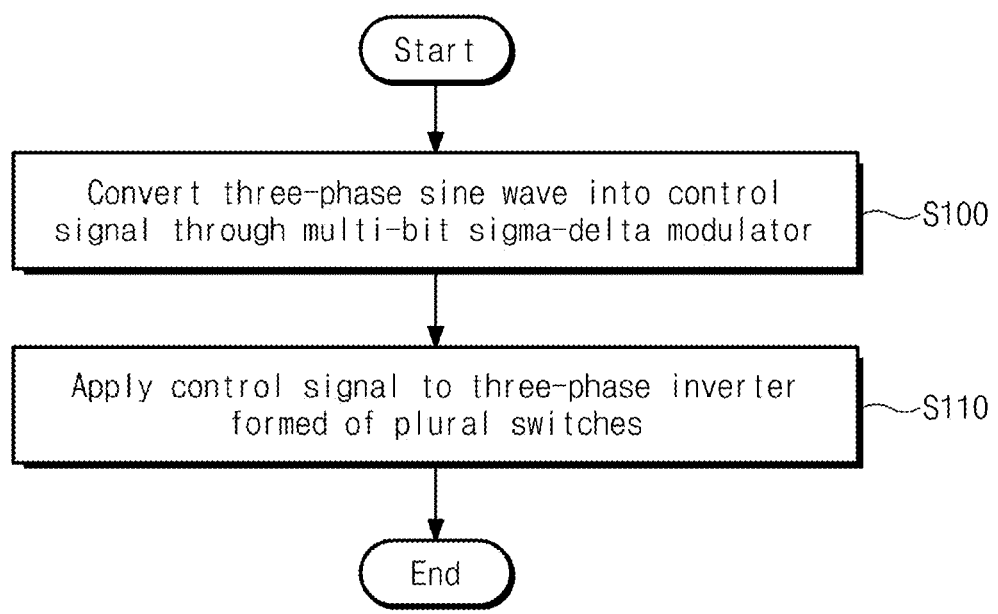
FIG. 14 is a flowchart illustrating a power control driving method according to an embodiment of the inventive concept.

FIG. 14 is a flowchart illustrating a power control driving method according to an embodiment of the inventive concept. Referring to FIG. 14, in operation S100, an input three-phase sine wave may be converted into a multi-bit digital control signal by a multi-bit sigma-delta modulator. In operation S110, the control signal may be applied to a three-phase inverter.

The three-phase inverter may include a plurality of switch units, each of which has a plurality of switch sets. Each bit of the control signal may be applied to each switch set. A switch set may be turned on or off according to an input control signal. That is, an output voltage may be varied. Afterwards, the method may be ended.

Figure 15:
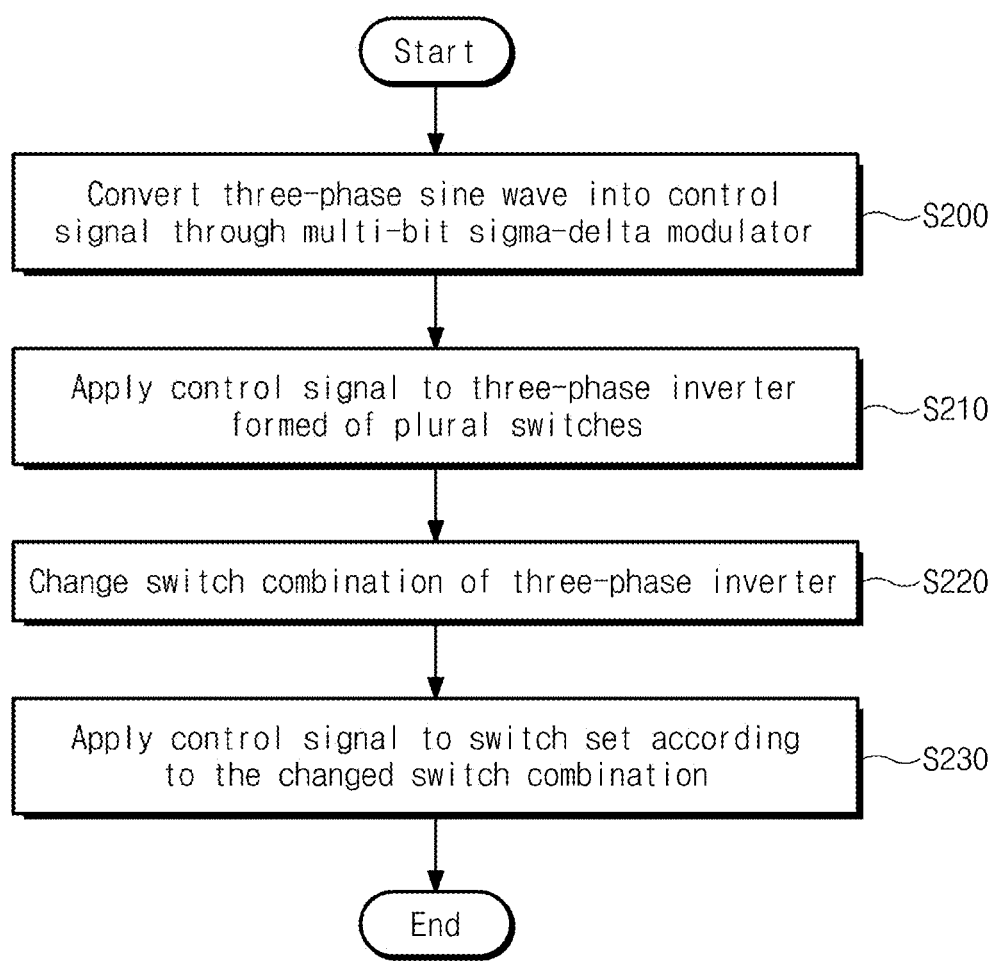
FIG. 15 is a flowchart illustrating a power control driving method using a recursive algorithm according to an embodiment of the inventive concept.

FIG. 15 is a flowchart illustrating a power control driving method using a recursive algorithm according to an embodiment of the inventive concept.

Referring to FIG. 15, in operation S200, an input three-phase sine wave may be converted into a multi-bit digital control signal by a multi-bit sigma-delta modulator. In operation S210, the control signal may be applied to a three-phase inverter.

The three-phase inverter may include a plurality of switch units, each of which has a plurality of switch sets. In operation S220, a combination of switches in a switch set may be changed. This may be made whenever a multi-bit signal is provided. Changing of switch sets may be circulated with a predetermined period.

In operation S230, the control signal may be applied to a switch set according to the changed switch combination. An on-off state of a switch set may be changed according to the input control signal. That is, an output voltage may be varied. Afterwards, the method may be ended. With the above operations, a noise characteristic may be improved by offsetting harmonic wave noise due to switches.

With the power control driving method in FIG. 15, a switch set may be changed before a control signal is applied to a switch set.

The inventive concept is described using a 3-bit sigma-delta modulator. However, the inventive concept is not limited thereto. The inventive concept may be applied to power control driving devices using all multi-bit sigma-delta modulators.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A power control driving device comprising:
a sine wave signal generating unit configured to generate a plurality of multi-phase sine waves;
a control signal converting unit configured to convert each of the plurality of multi-phase sine waves into a pair of a multi-bit control signal and an inversion signal, wherein each multi-phase sine wave of the plurality of multi-phase sine waves is converted from an analog to a digital signal by a separate multi-bit sigma-delta modulator; and
a three-phase inverter circuit configured to output a voltage varied by the multi-bit control signal and the inversion signal from the control signal converting unit, wherein the inverter circuit includes a plurality of pairs of switch units, each pair of switch units matching with a corresponding pair of the multi-bit control signal and the inversion signal, each pair of switch units including an upper switch unit receiving the multi-bit control signal and a lower switch unit receiving the inversion signal,
wherein an on-off state of each pair of switch units is determined by the corresponding pair of the multi-bit control signal and the inversion signal from the control signal converting unit, and
wherein each of the plurality of pairs of switch units includes a plurality of switch sets, each of which has switches weighted according to a binary ratio.

2. The power control driving device of claim 1, wherein a secondary sigma-delta modulator is used as the separate multi-bit sigma-delta modulator.

3. The power control driving device of claim 1, wherein a 3-bit sigma-delta modulator is used as the separate multi-bit sigma-delta modulator.

4. The power control driving device of claim 1, wherein each switch set of the plurality of switch sets is supplied with a bit of the multi-bit control signal or the inversion signal from the control signal converting unit.

5. The power control driving device of claim 1, wherein each switch unit in each of the plurality of pairs of switch units includes a driving level sequencer to change a combination of the switches constituting the switch set.

6. The power control driving device of claim 5, wherein the driving level sequencer stepwise changes a combination of the switches constituting the switch set by a control signal input unit.

7. The power control driving device of claim 5, wherein the driving level sequencer circulates a combination of the switches with a predetermined period.

8. The power control driving device of claim 1, wherein the upper switch unit and the lower switch unit are connected in series.

9. The power control driving device of claim 1, wherein the multi-bit control signal and the inversion signal are opposite to each other resulting in opposite on-off states for the upper switch unit and the lower switch unit.

10. The power control driving device of claim 1, wherein each switch unit of the plurality of pairs of switch units includes three switch sets.

11. The power control driving device of claim 10, wherein the three switch sets may be weighted sets having a ratio of 4:2:1.

12. A power control driving method comprising:

generating a plurality of multi-phase sine waves;

converting each of the plurality of multi-phase sine waves into a pair of a multi-bit digital control signal and a digital inversion signal using a separate sigma-delta modulator for each multi-phase sine wave; and providing the pair of the multi-bit digital control signal and the digital inversion signal to a three-phase inverter circuit, wherein the three-phase inverter circuit includes a plurality of pairs of switch units, each pair of switch units matching with a corresponding pair of the multi-bit control signal and the inversion signal, wherein each pair of switch units includes an upper switch unit receiving the multi-bit control signal and a lower switch unit receiving the inversion signal, wherein an on-off state of each pair of switch units is determined by the corresponding pair of the multi-bit control signal and the inversion signal from the control signal converting unit, and wherein each of the plurality of pairs of switch units includes a plurality of switch sets, each of which has switches weighted according to a binary ratio.

13. The power control driving method of claim 12, further comprising:

changing a combination of switches included in switch sets to obtain a smooth and noise-reduced output waveform.

14. The power control driving method of claim 13, wherein changing a combination of switches includes circulating the combination of switches with a predetermined period.

15. The power control driving method of claim 12, wherein the separate multi-bit sigma-delta modulator is a 3-bit sigma-delta modulator.

16. The power control driving method of claim 12, wherein each switch unit in each of the plurality of pairs of switch units includes a driving level sequencer to change a combination of the switches constituting the switch sets.

17. The power control driving method of claim 12, wherein the multi-bit control signal and the inversion signal are opposite to each other resulting in opposite on-off states for the upper switch unit and the lower switch unit.

18. The power control driving method of claim 12, wherein each switch unit of the plurality of pairs of switch units includes three weighted switch sets having a ratio of 4:2:1.

* * * * *